United States Patent
Chen

(10) Patent No.: US 6,588,683 B1
(45) Date of Patent: Jul. 8, 2003

(54) FASTENING STRUCTURE OF A BARREL AND HANDLE OF A GARDENING SPRAY NOZZLE

(75) Inventor: Chin-Yuan Chen, Chang-Hua Hsien (TW)

(73) Assignee: Shin Tai Spurt Water of the Garden Tools Co., Ltd., Chang-Hua Hsien (TW)

(*) Notice: Subject to any disclaimer, the term of this patent is extended or adjusted under 35 U.S.C. 154(b) by 0 days.

(21) Appl. No.: 10/320,777

(22) Filed: Dec. 17, 2002

(51) Int. Cl.⁷ ............................................... B05B 15/06
(52) U.S. Cl. ....................... 239/532; 239/280; 239/600; 239/525; 285/914
(58) Field of Search ................................ 239/532, 531, 239/600, 280, 526, 525; 285/330, 914, 913

(56) References Cited

U.S. PATENT DOCUMENTS

| | | | | |
|---|---|---|---|---|
| 4,880,166 A | * | 11/1989 | Suttner ........................ | 239/526 |
| 5,971,019 A | * | 10/1999 | Imai ............................. | 285/914 |
| 6,209,804 B1 | * | 4/2001 | Spriegel ...................... | 285/246 |
| 6,216,965 B1 | * | 4/2001 | Chao ........................... | 239/280 |
| 6,220,527 B1 | * | 4/2001 | Chen et al. .................. | 239/532 |

* cited by examiner

Primary Examiner—Michael Mar
Assistant Examiner—Dinh Q. Nguyen
(74) Attorney, Agent, or Firm—Harrison & Egbert

(57) ABSTRACT

A gardening spray nozzle includes a handle and a barrel. The handle is provided with a hollow neck which is provided in the inner wall with one retaining projection and an annular furrow. The barrel is provided in the wall of a fastening end with a retaining slot, and in the outer surface of the wall with an annular groove. The barrel is fastened to the handle in conjunction with a retaining ring and a ferrule which is fastened to the neck. The retaining projection of the neck is fitted into the retaining slot of the barrel to prevent the radial displacement of the barrel. The retaining ring is jointly located in the annular furrow of the neck and the annular groove of the barrel to prevent the axial displacement of the barrel.

1 Claim, 4 Drawing Sheets

FASTENING STRUCTURE OF A BARREL AND HANDLE OF A GARDENING SPRAY NOZZLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a gardening spray nozzle, and more particularly to a structure for fastening a barrel and a handle of the gardening spray nozzle.

BACKGROUND OF THE INVENTION

The conventional gardening spray nozzle comprises a barrel which is fastened at one end to a nozzle head, and at the other end to a handle. The barrel is fastened to the handle by a ferrule in conjunction with a washer. Such a fastening structure as described above is grossly insufficient in terms of structural strength and locating effect. As a result, the barrel becomes loosened easily. In light of the nozzle head being tilted, the barrel cannot be securely held by the handle.

BRIEF SUMMARY OF THE INVENTION

The primary objective of the present invention is to provide a gardening spray nozzle with a fastening structure capable of holding securely a barrel and a handle of the gardening spray nozzle.

The fastening structure of the present invention comprises a retaining slot which is located in the wall of a fastening end of the barrel; a retaining projection which is located in the inner wall of a threaded neck of the handle and is shaped to fit into the retaining slot of the fastening end of the barrel; a ferrule fastened with the threaded neck of the handle; and a retaining ring located jointly by a retaining groove of the fastening end of the barrel and a furrow of the threaded neck of the handle. The fastening structure of the present invention may comprise a plurality of retaining slots and retaining projections.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
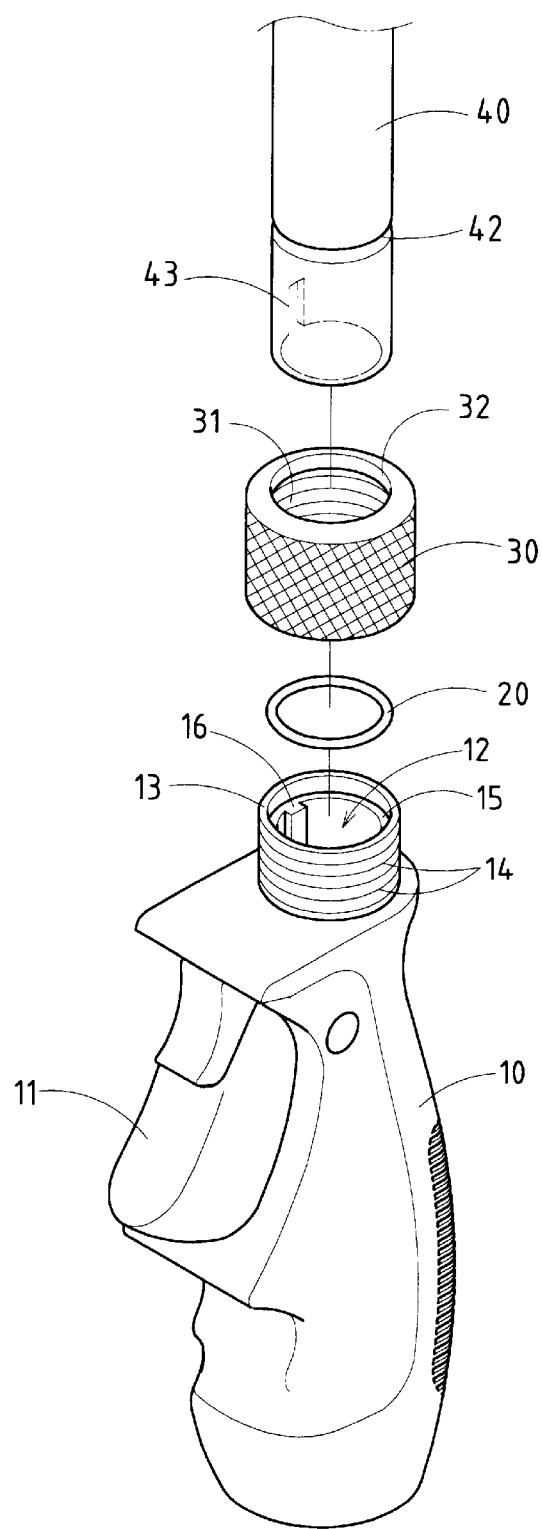
FIG. 1 shows an exploded perspective view of the preferred embodiment of the present invention.
Figure 2:
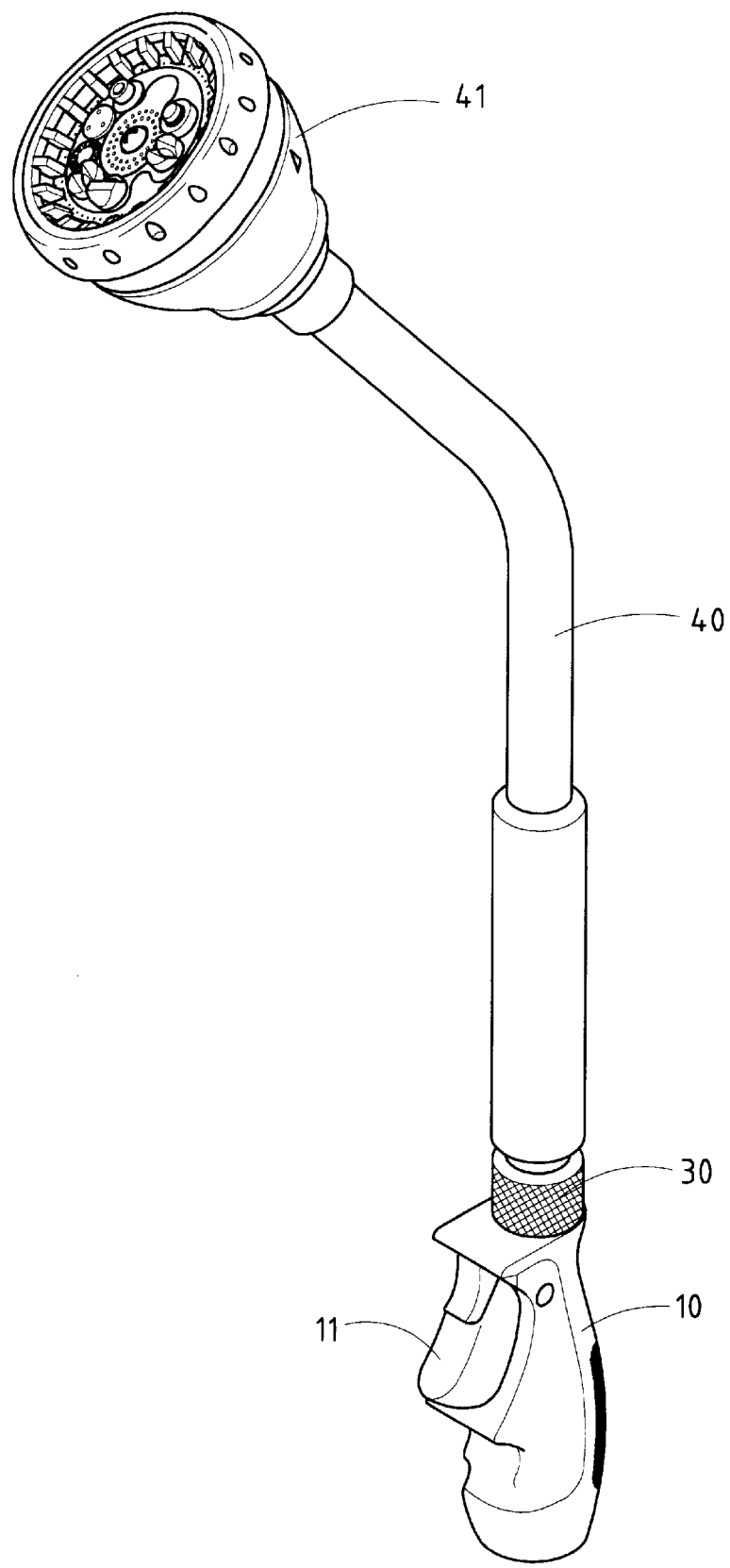
FIG. 2 shows a perspective view of the preferred embodiment of the present invention.

As shown in FIGS. 1–4, a gardening spray nozzle embodied in the present invention comprises a handle 10, a barrel 40, and a nozzle head 41.

The handle 10 is provided with an ON-OFF switch 11, and a threaded neck 13, which is provided in the interior with a water passage 12 and in the outer wall with a plurality of threads 14. The threaded neck 13 is provided in the inner wall with an annular furrow 15 for locating a retaining ring 20, and a retaining projection 16 extending along the longitudinal direction of the neck 13.

The barrel 40 is fastened at the top end with the nozzle head 41 and is provided in the outer wall of the bottom end with an annular groove 42. The barrel 40 is provided in the wall of the bottom end with a retaining slot 43 of a predetermined length and extending from the bottom end along the longitudinal direction of the barrel 40. The retaining slot 43 is shaped to receive the retaining projection 16 of the threaded neck 13 of the handle 10.

Figure 3:
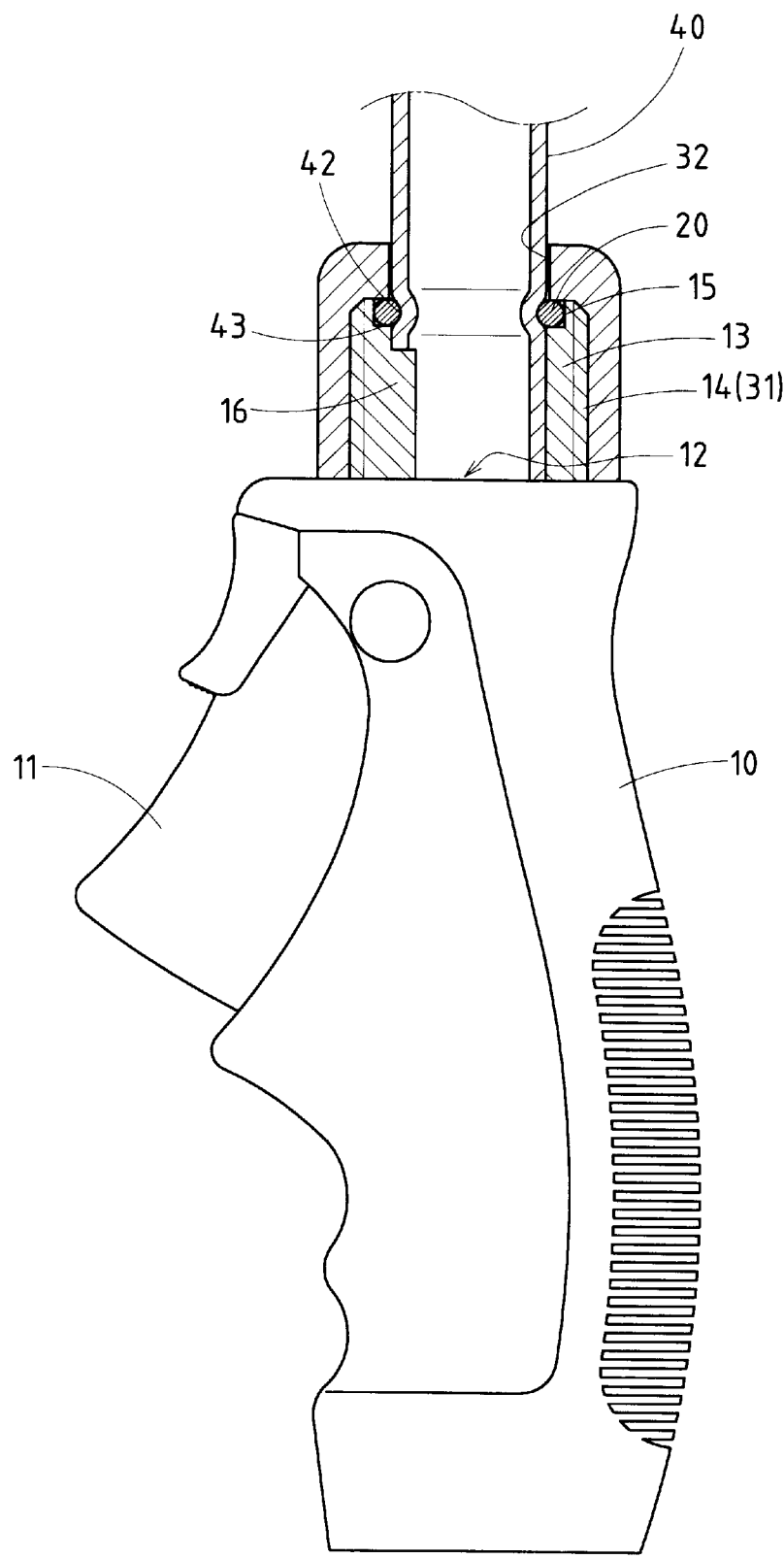
FIG. 3 shows a longitudinal sectional view of the fastening structure of the preferred embodiment of the present invention.
Figure 4:
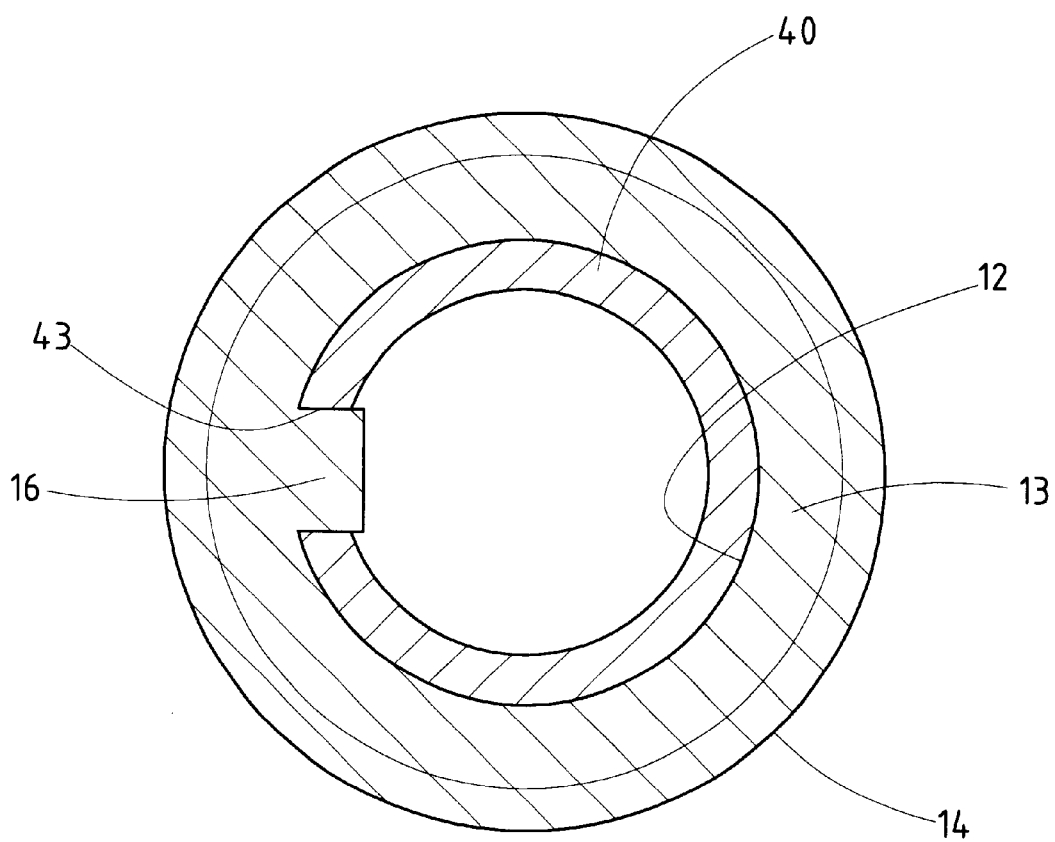
FIG. 4 shows a cross sectional view of the fastening structure of the preferred embodiment of the present invention.

The barrel 40 is fastened with the handle 10 in conjunction with a ferrule 30 which has a through hole 32 with inner threads 31. The bottom end of the barrel 40 is inserted into the threaded neck 13 via the through hole 32 of the ferrule 30 that is fastened with the threaded neck 13 of the handle 10 by means of the inner threads 31 which are engaged with the outer threads 14 of the neck 13, as shown in FIG. 3. In the meantime, the retaining ring 20 is jointly located by the furrow 15 of the neck 13 and the annular groove 42 of the barrel 40. The retaining projection 16 of the neck 13 of the handle 10 is fitted into the retaining slot 43 of the barrel 40, as shown in FIG. 4. The barrel 40 is thus securely located by a combined effect of the retaining slot 43 and the retaining projection 16. In other words, the radial displacement of the barrel 40 is prevented by the combined effect of the retaining slot 43 and the retaining projection 16. In light of the retaining ring 20 being located in the annular groove 42 of the barrel 40 and the furrow 15 of the neck 13 of the handle 10, the axial displacement of the barrel 40 is averted.

The embodiments of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A gardening spray nozzle comprising:

a handle comprised of, at one end, a hollow neck extending therefrom;

a barrel fastened at a first fastening end to said neck of said handle in conjunction with a ferrule; and a nozzle head fastened to a second fastening end of said barrel;

wherein said neck is comprised of, in an inner wall, an annular furrow, at least one retaining projection of a length and a width and extending along a longitudinal direction of said neck, and a retaining ring located in said annular furrow; and wherein said first fastening end of said barrel is comprised of, in a wall thereof, a retaining slot extending from a bottom end of said first fastening end along a longitudinal direction of said barrel, said retaining slot being corresponding in length and width to said retaining projection of said neck of said handle, said first fastening end of said barrel further provided in an outer surface of the wall thereof with an annular groove whereby said barrel is fastened at said first fastening end to said neck of said handle in such a way that the first fastening end of said barrel is inserted into said neck, and such that said retaining projection of said neck is fitted into said retaining slot of said barrel so as to avert the radial displacement of said barrel, and that said retaining ring is jointly located in said annular furrow of said neck and said annular groove of said first fastening end of said barrel so as to prevent the axial displacement of said barrel.

\* \* \* \* \*